United States Patent [19]

Morgan

[11] Patent Number: 4,663,936
[45] Date of Patent: May 12, 1987

[54] LOAD SENSING PRIORITY SYSTEM WITH BYPASS CONTROL

[75] Inventor: David F. Morgan, Minnetonka, Minn.

[73] Assignee: Eaton Corporation, Cleveland, Ohio

[21] Appl. No.: 618,156

[22] Filed: Jun. 7, 1984

[51] Int. Cl.$^4$ ............................................. F15B 11/16
[52] U.S. Cl. ........................................ 60/422; 60/468;
60/484; 60/494; 91/516; 137/117
[58] Field of Search ................. 60/384, 385, 387, 388,
60/494, 420, 422, 426, 484, 468; 417/299;
137/117, 596, 596.12, 596.13; 91/516

[56] References Cited

U.S. PATENT DOCUMENTS

| | | | |
|---|---|---|---|
| 2,649,688 | 8/1953 | Slomer | 91/451 |
| 2,737,196 | 3/1956 | Eames | 137/101 |
| 3,628,571 | 12/1971 | Ostwald et al. | 137/596 |
| 3,878,679 | 4/1975 | Sievenpiper | 60/422 |
| 3,939,859 | 2/1976 | Ueda et al. | 137/118 |
| 3,976,090 | 8/1976 | Johnson | 417/299 |
| 3,978,666 | 9/1976 | Kelly et al. | 60/468 X |
| 4,017,218 | 4/1977 | Burk et al. | 417/216 |
| 4,043,419 | 8/1977 | Larson et al. | 180/132 |
| 4,044,786 | 8/1977 | Yip | 137/101 |
| 4,355,655 | 10/1982 | Hertell et al. | 137/117 |

FOREIGN PATENT DOCUMENTS 2003101 3/1979 United Kingdom .

Primary Examiner—Michael Koozo
Attorney, Agent, or Firm—D. A. Rowe; L. J. Kasper

[57] ABSTRACT

A load sensing priority flow control system is disclosed of the type including an engine-driven pump (11), a load sensing priority flow control valve (15), a priority load circuit (steering control valve (17) and steering cylinder (21)), and an auxiliary load circuit (19). Disposed between the excess flow output port (45) of the priority valve and the auxiliary load circuit (19) is a bypass valve arrangement (55) including a bypass valve member (57) which is biased by a downstream pressure signal (61) and spring (63) to a first position in which the auxiliary load circuit is communicated to the reservoir, to prevent loading the system and stalling the engine when the engine speed and flow from the excess flow port (45) are below a predetermined minimum. As engine speed and flow from the port (45) increase, an upstream pressure signal (59) biases the bypass valve toward a second position in which the auxiliary load circuit is blocked from communication with the reservoir, and can be pressurized and actuated.

8 Claims, 4 Drawing Figures

LOAD SENSING PRIORITY SYSTEM WITH BYPASS CONTROL

BACKGROUND OF THE DISCLOSURE

The present invention relates to a system for providing pressurized fluid to a plurality of load circuits, and more particularly, to such a system in which one of the load circuits is given priority, with all flow not being used by the priority circuit going to the other (auxiliary) load circuit.

The present invention is equally adapted to any arrangement in which pressurized fluid is communicated to a priority load circuit and an auxiliary load circuit by a load sensing priority flow control valve, in response to a load pressure signal indicating the demand for fluid by the priority load circuit. However, the invention is especially advantageous in arrangements in which the priority load circuit comprises a vehicle hydrostatic power steering system and the invention will be described in connection therewith.

Load sensing priority flow control systems are used in many applications in order to provide pressurized flow to multiple load circuits from a single source (pump), partly to make the overall system less expensive, and partly to minimize the energy consumption (i.e., the load on the vehicle engine). Typically, in such vehicle applications, the vehicle engine is set to idle at a particular, minimum speed (idle speed), such as 600 rpm. Based upon this predetermined idle speed of the engine, the hydraulic pump and various other components are selected and sized such that the fluid output of the pump, at engine idle, is sufficient to satisfy at least a minimal demand for fluid by the priority load circuit. For example, if the priority load circuit is the vehicle power steering system, the various hydraulic components must be sized such that, at engine idle, the pump provides at least sufficient fluid to steer the vehicle at a rate which is consistent with safety requirements and through any range of loads likely to be experienced. Because one of the conditions frequently encountered is steering against the travel limits, it is preferable to limit the steering system to a pressure substantially below the maximum system pressure available to the auxiliary load circuit.

In some systems of the type described above, when the engine is operating at idle speed, the engine doesn't have enough power to drive the fluid pump to provide adequate pressure, even at a low flow rate, to operate the auxiliary load circuit, without stalling the vehicle engine. If the vehicle operator attempts to actuate the auxiliary load circuit with the engine at idle speed, there will normally not be sufficient fluid output from the pump, in terms of flow or pressure, to actuate the auxiliary implements in the manner desired. However, the actuation the auxilary load circuit can impose a load great enough on the vehicle engine to stall the engine, which, if permitted to occur periodically, would result in very inefficient operation of the vehicle, and in some cases, may result in a potentially dangerous situation with regard to the control of heavy moving loads.

Various anti-stall control arrangements have been developed for vehicle hydraulic systems, especially for use in connection with hydrostatic transmission systems which include variable displacement pumps. Typically, the engine speed is either sensed directly, such as by means of a magnetic pickup which reads shaft rpm, or is sensed indirectly by means of a pressure drop across a fixed orifice. In either case, known anti-stall controls normally involve either reducing the displacement of the pump to reduce the load on the engine, or increasing the engine throttle setting. In either case, known anti-stall control systems are normally fairly complex and expensive, and their use generally results in various operating problems such as higher power loss at optimum engine speeds.

SUMMARY OF THE INVENTION

Accordingly, it is an object of the present invention to provide an improved load sensing priority flow control system which is able to prevent stalling of the vehicle engine when the engine is operating at or near engine idle speed.

It is a related object of the present invention to provide such a system in which the above-stated object is accomplished without major changes in the system, and by means of a simple, reliable valve arrangement which can also be readily retrofit on existing vehicles.

It is another object of the present invention to provide a system which accomplishes the above-stated objects both when the engine is beginning to accelerate from engine idle, and also when the engine is decelerating down toward engine idle.

The above and other objects of the present invention are accomplished by the provision of a system of the type for controlling the flow of fluid from a source of pressurized fluid to a priority load circuit and to an auxiliary load circuit. The priority load circuit includes valve means defining a main, variable flow control orifice and means providing a load pressure signal means representative of the demand for fluid flow by the priority load circuit. A priority flow control valve means includes an inlet port in fluid communication with the source of fluid, a priority outlet port in fluid communication with the priority load circuit, and an excess flow outlet port in fluid communication with the auxiliary load circuit. A priority valve member is included and is movable between one position permitting substantially unrestricted fluid communication from the inlet port to the priority outlet port, and another position permitting substantially unrestricted fluid communication from the inlet port to the excess flow outlet port. Also included is a means biasing the priority valve member toward the one position, the priority valve member being biased toward another position by the load pressure signal means communicated from the priority load circuit.

The system is characterized by a bypass valve means disposed in series flow relationship between the excess flow outlet of the priority flow control and the auxiliary load circuit controls. The bypass valve means includes a bypass valve member and means biasing the bypass valve member toward a first position in which the bypass valve member is operable to communicate the auxiliary load ciroult to a region of relatively low pressure fluid, such as the system reservoir. The bypass valve member defines flow orifice means disposed such that substantially all flow to the auxiliary load circuit flows through the flow orifice means. The flow through the flow orifice means results in a pressure differential across the bypass valve member and flow orifice means, the pressure differential biasing the bypass valve member, in opposition to the biasing means, toward a second position in which the bypass valve member substantially prevents fluid communication from the auxiliary load circuit to the region of relatively low pressure fluid. As a result of the bypass valve means, below a predetermined flow from the excess flow outlet port, the bypass valve member is biased toward the first position, and attempted actuation of the auxiliary load circuit is ineffective to increase the load on the system, because the auxiliary load circuit is communicated to the low-pressure region. As a result, it is impossible for the operator to stall the engine, by trying to actuate the auxiliary load circuit.

DESCRIPTION OF THE PREFERRED EMBODIMENT

Figure 1:
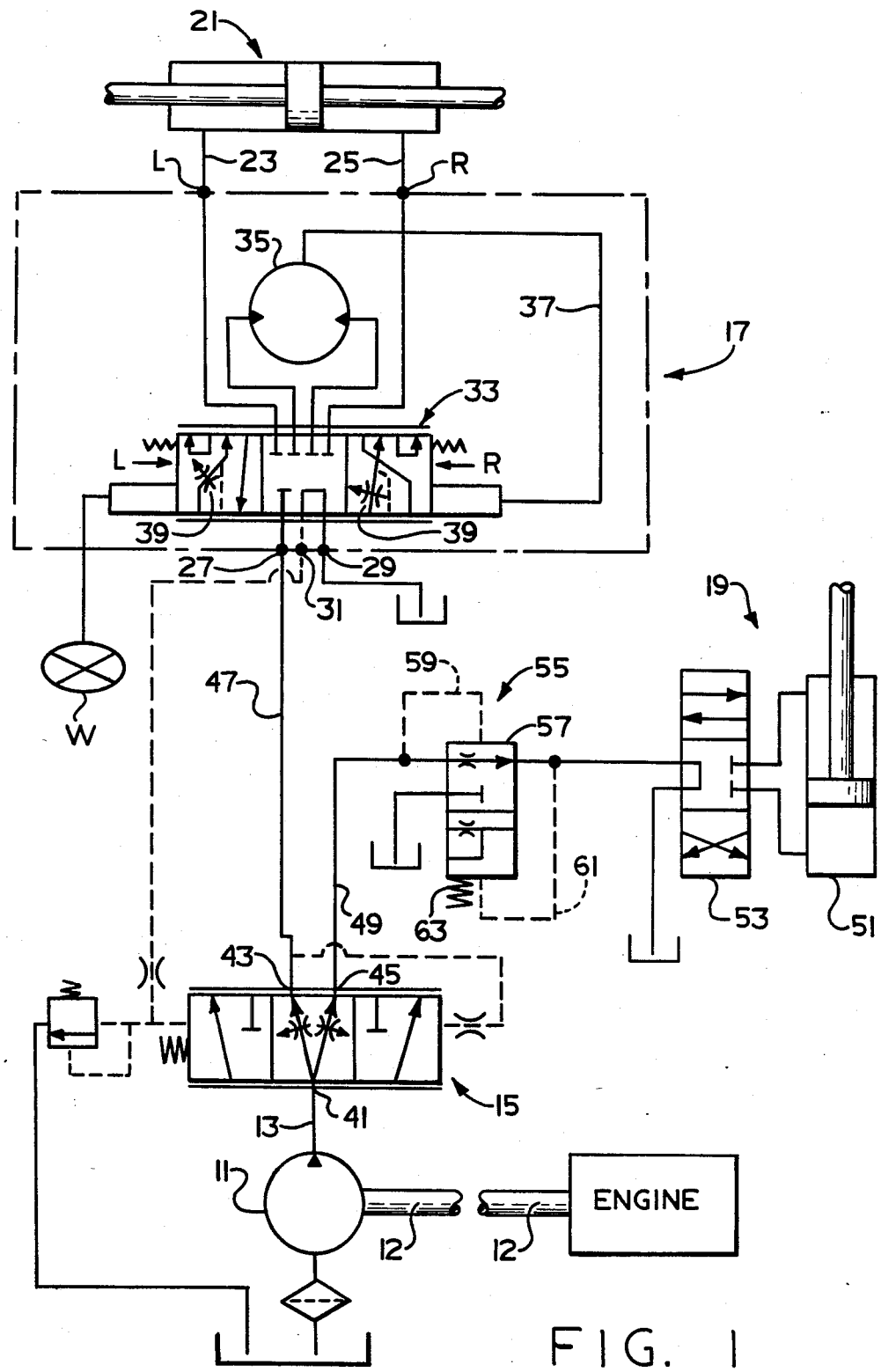
FIG. 1 is a hydraulic schematic of a preferred embodiment of the present invention.

Referring now to the drawings, which are not intended to limit the present invention, FIG. 1 illustrates schematically a load sensing, priority flow control system of the type with which the present invention may be used. The system includes a vehicle engine E which drives a hydraulic pump 11 by means of an input shaft 12. For simplicity, the pump 11 is shown herein as being of the fixed displacement type, wherein pump output flow is always proportional to engine speed. However, it should be understood that within the scope of the invention the pump 11 could also be a pressure-compensated, variable displacement pump or a load sensing pump.

The output of the pump 11 is communicated by means of a conduit 13 to a load sensing priority flow control valve, generally designated 15. The valve 15 is operable to "divide" or apportion the fluid output of the pump 11 between a steering control valve, generally designated 17, which constitutes the priority load circuit, and an auxiliary load circuit, generally designated 19.

The steering control valve 17, which will be described only briefly herein, includes a left fluid port L and a right fluid port R which are connected to the opposite ends of a steering cylinder 21 by a pair of fluid conduits 23 and 25, respectively. The steering control valve 17 further includes a fluid inlet port 27, a fluid return port 29, and a load signal port 31. Disposed within the steering control valve 17 is a valving arrangement, generally designated 33, which is movable from its neutral position shown in FIG. 1 to either a right-turn position or a left turn position. The valving arrangement 33 is well known in the art, is described in greater detail in U.S. Pat. No. Re. 25,126 and will not be described further herein. When the valving arrangement 33 is in either of the turn positions, the pressurized fluid flowing therethrough flows through a fluid meter 35, the function of which is to measure the proper amount of fluid to be fed to the appropriate fluid port L or R. The fluid meter 35 is typically connected to the valving arrangement 33 by means of a mechanical follow-up 37.

In either of the turn positions, the valving arrangement 33 defines a main, variable flow control orifice 39, the flow area of which is generally proportional to the deflection, by means of a steering wheel W, of the valving arrangement 33.

In systems of the type to which the present invention relates, substantially all of the fluid output of the pump 11 passes through the priority flow control valve 15. The priority flow control valve 15 includes an inlet port 41, a priority outlet port 43, and an excess flow outlet port 45. The priority outlet port 43 is in fluid communication with the inlet port 27 of the steering control valve 17 by means of a fluid conduit 47, while the excess flow outlet port 45 is in communication with the auxiliary load circuit 19 by means of a conduit 49.

The auxiliary load circuit 19 includes a fluid actuated cylinder, and a conventional three-position, four-way direction and flow control valve 53 for communicating fluid to and from the opposite ends of the cylinder 51, to actuate a vehicle implement which does not require fluid "priority." In the embodiment shown, the flow control valve 53 is an open-center valve, although it should be clearly understood that the present invention is not limited to any particular type of auxiliary load circuit 19, or to any particular type of fluid-actuated device, or to any particular type of flow control arrangement. It should also be noted that although the auxiliary load circuit 19 is illustrated herein as being of the open-center type, it could also be of the closed-center or load sensing type. However, whereas the pump would normally be variable displacement if the auxiliary load circuit is closed-center, and the pump would normally be load sensing if the auxiliary load circuit is load sensing (see U.S. Pat. No. 4,043,419), the use of the present invention effectively makes the overall auxiliary load circuit open-center, and therefore, the present invention makes it possible to use a simpler, less expensive fixed displacement pump regardless of the actual type of auxiliary load circuit being used.

Disposed in series flow relationship in the conduit 49, between the excess flow outlet port 45 and the control valve 53 is a bypass valve arrangement, generally designated 55, which will be described in greater detail in conjunction with FIGS. 2 and 3, and for now will be described only schematically as it relates to FIG. 1. The bypass valve arrangement 55 includes a movable bypass valve member 57 which is biased toward the position shown in FIG. 1 by an upstream pressure signal 59, and is biased upwardly in FIG. 1 by the combination of a downstream pressure signal 61 and a biasing spring 63.

In the position shown in FIG. 1, the valve member 57 provides relatively unrestricted fluid communication through the conduit 49 from the excess flow outlet port 45 to the flow control valve 53, and blocks communication to the system reservoir. The position of the valve member 57, shown in FIG. 1, occurs when the differential between the pressure signals 59 and 61 is sufficient to overcome the spring 63, i.e., when the flow out of the excess flow outlet port 45 exceeds some predetermined flow rate. It is one aspect of the present invention that this predetermined flow rate corresponds approximately to engine idle speed, or to some speed greater than engine idle, when it is desired to provide a margin if stalling of the engine occurs close to idle speed.

When the differential between the pressure signals 59 and 61 is insufficient to overcome the spring 63, the valve member 57 is biased to its upward position (in FIG. 1). In this position of the valve member 57, the excess flow outlet port 45, the conduit 49, and the auxiliary load circuit 19 are all in fluid communication with the system reservoir. Therefore, when the engine is operating at or below the predetermined speed, and the flow through the conduit 49 is below the corresponding minimum flow rate, if the vehicle operator attempts to actuate the auxiliary load circuit 19 by shifting the control valve 53 from its neutral position shown in FIG. 1 to either of the actuated positions, there is no pressurized fluid available in conduit 49. As a result, the attempted actuation of the auxiliary load circuit 19 is ineffective to increase the load on the system, and the speed of the vehicle engine does not lug down below the predetermined engine speed. It should also be noted that this bypass function, whereby the auxiliary load circuit 19 cannot be actuated (i.e., pressurized) below a predetermined engine speed and flow from the excess flow port 45 occurs in the same manner whether the engine is being accelerated from its idle speed, up to the predetermined speed, or is being decelerated from below the predetermined speed down to the idle speed. Therefore, when the vehicle operator attempts to actuate the auxiliary load circuit 19 with the vehicle engine at idle, rather than possibly stalling the engine as would have occurred prior to this invention, there will be no movement of the rod extending from the cyclinder 51, and the operator will be compelled to accelerate the engine above the predetermined speed to provide sufficient flow out of the excess flow port 45 to cause the valve member 57 to shift to the position shown in FIG. 1, thus making it possible to pressurize the auxiliary load circuit. Accelerating the engine in this manner is a natural reaction for a trained operator, and therefore, operation of a system including the present invention will not require substantial learning time.

Figure 2:
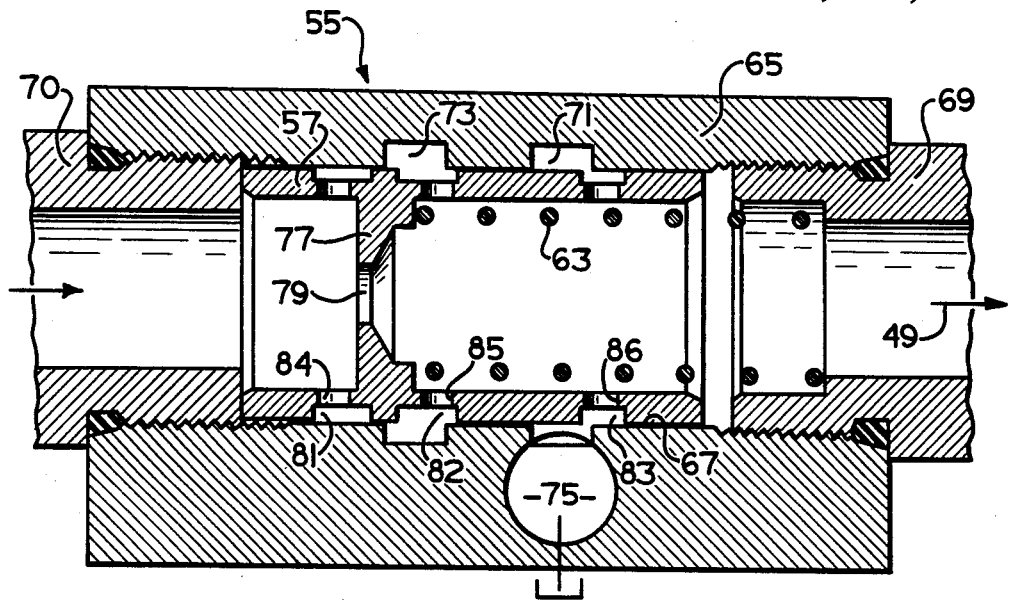
FIG. 2 is an axial cross section of the bypass valve means included in the schematic of FIG. 1.

Referring now primarily to FIG. 2, the bypass valve arrangement 55 comprises a valve housing 65, which defines an axial valve bore 67. The opposite ends of the valve bore 67 define internal threads to facilitate engagement with a pair of threaded fittings 69 and 70.

The valve housing 65 further defines a pair of annular grooves 71 and 73, the annular groove 71 being in fluid communication with the system reservoir through a passage 75. Disposed within the valve bore 67 is the bypass valve member 57, which was described schematically in connection with FIG. 1. It should be noted that in FIG. 2 the valve member 57 is biased by the spring 63 to the "bypass" position, corresponding to the upward position of the valve member 57 in FIG. 1.

The valve member 57 comprises a generally cylindrical, hollow spool member, including a transverse wall 77 defining a fixed flow orifice 79. It is the pressure differential across the orifice 79 which positions the valve member 57, corresponding to the differential between the pressure signals 59 and 61 in the schematic of FIG. 1.

The valve member 57 defines a plurality of annular grooves 81, 82, and 83, each of which is in continuous fluid communication with the interior of the valve member 57 through a plurality of radial bores 84, 85, 86, respectively.

With the engine operating at idle speed, below the predetermined engine speed, the flow through the fixed orifice 79 is insufficient to operate the auxiliary load circuit, without stalling the engine, and the spring 63 biases the valve member 57 against the threaded fitting 70. With the valve member 57 in the position shown in FIG. 2, the auxiliary load circuit 19 cannot be actuated (pressurized) because the conduit 49 is in relatively unrestricted communication with the system reservoir through the radial bore 86, annular groove 83, annular groove 71, and passage 75.

As engine speed increases from idle, and flow out of the excess flow port 45 increases toward the predetermined flow rate, the pressure differential across the fixed orifice 79 gradually increases, and the valve member 57 gradually moves to the right in FIG. 2 in opposition to the spring 63. As the valve member 57 approaches a position in which the annular groove 83 is prevented from communicating with the annular groove 71, the pressure in the conduit 49, upstream of orifice 79, begins to increase until the annular grooves 83 and 71 are completely out of fluid communication. At this point, the fluid pressure in the conduit 49 approximately corresponds to the load being exerted on the cylinder 51.

Figure 3:
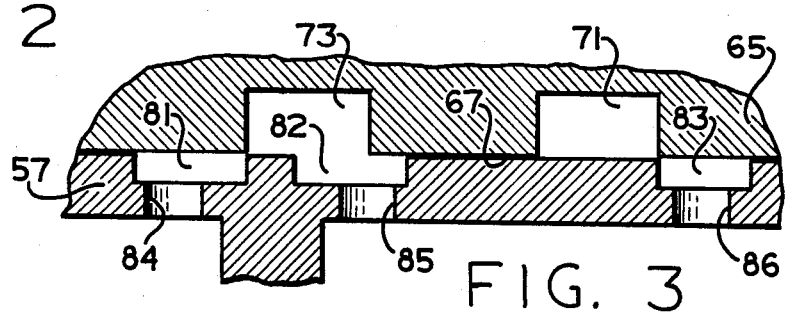
FIG. 3 is an enlarged, fragmentary view, similar to FIG. 2, illustrating the bypass valve in a different operating condition.

Referring now to FIG. 3, it may be seen that one aspect of the present invention is the addition of a secondary, variable flow orifice in parallel with the fixed orifice 79. It will be understood by those skilled in the art that as the rate of flow through the fixed orifice 79 progressively increases, the pressure drop across the orifice 79 increases exponentially. However, once the pressure differential across the fixed orifice 79 has reached a level such that communication between the annular grooves 83 and 71 is blocked, it is not necessary or desirable for there to be further increase in the pressure drop across the valve member 57, because the greater pressure drop represents wasted engine horsepower and energy.

Referring still to FIG. 3, when the valve member 57 has reached the position in which the annular grooves 83 and 71 are blocked from communication, the annular grooves 81 and 73 begin to communicate, the position of the valve member 57 shown in FIG. 3 corresponding approximately to the predetermined flow rate from the excess flow port 45. This also corresponds to the portion labeled "FIG. 3" on the graph of FIG. 4, i.e., with the valve member 57 in approximately the position shown in FIG. 3, a relatively small increase in flow out of the excess flow port 45 will result in a rise in pressure in the conduit 49, and therefore, a rise in pressurized flow to the auxiliary load circuit 19.

Referring again primarily to FIG. 3, it may be seen that a further increase in flow from the excess flow port 45, and resulting increase in pressure differential across the fixed orifice 79 will result in movement of the valve member 57 further to the right, thus beginning to open the secondary, variable orifice in parallel with the orifice 79. This orifice comprises flow through the radial bores 84, the annular groove 81, the annular groove 73, the annular groove 82, and the radial bores 85. It should also be noted that it is possible to size the bores and grooves just recited, such that further increase in flow rate will result in an increasing pressure differential across the valve member 57, the increase being approximately proportional to the increase in the force of the spring 63 as the valve member 57 moves further to the right in FIG. 3. Furthermore, the valve member 57 is positioned, relative to the grooves 71 and 73, and relative to the plug 69, such that the area of the secondary orifice continues to increase as long as the valve member 57 moves to the right (i.e., until it is stopped by the plug 69). The valve member 57 is not allowed to move far enough to the right for the net effect of flow area of the secondary orifice to begin to decrease, i.e., communication between grooves 82 and 73 begins to decrease.

Figure 4:
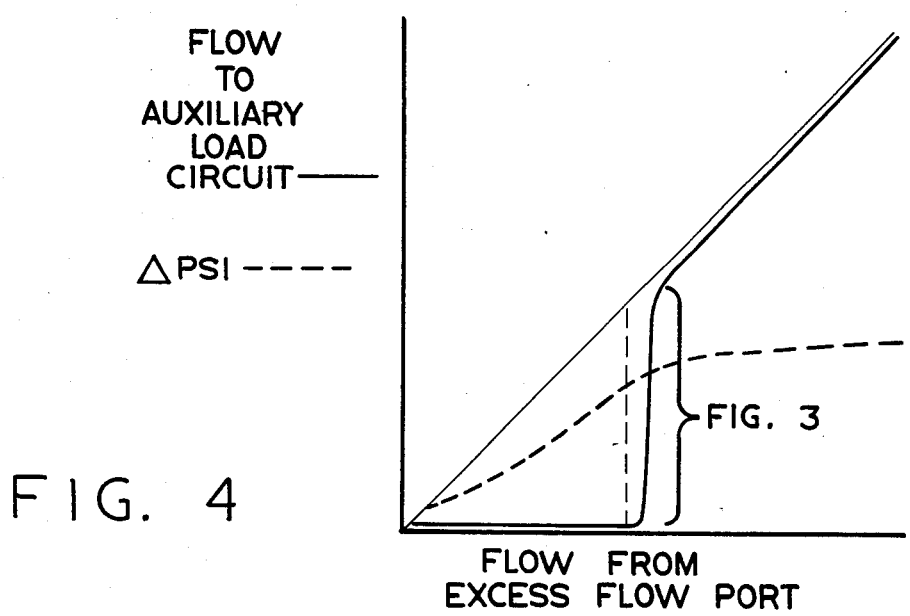
FIG. 4 is a graph of flow to the auxiliary load circuit versus flow out of the excess flow port, illustrating the functional effect of the present invention.

Referring again to the graph of FIG. 4, it should be noted that after the "bypass" path to the reservoir is closed, and the secondary, variable orifice begins to open, the graph of flow to the auxiliary load circuit becomes 100% of flow out of the excess flow port.

It will be understood by those skilled in the art that, within the scope of the present invention, there are various possible alterations and modifications of the present invention. For example, although bypass valve arrangement 55 is illustrated as disposed in the conduit 49, intermediate the auxiliary load circuit 19 and priority valve 15, it would be possible to have the bypass valve integral with either the priority valve 15 (e.g., threaded into the excess flow port 45), or integral with the flow control valve 53 of the auxiliary load circuit (e.g., threaded into the inlet port of the valve 53).

In the subject embodiment, for the purpose of simplicity, FIG. 3 illustrates a "zero lap" condition between the closing of the bypass path (grooves 83 and 71) and the opening of the secondary orifice (grooves 82 and 73). However, it should be understood by those skilled in the art that, within the scope of the invention, the above-described lap relationship could also be either an underlapped or an overlapped condition. In addition, any of the above-recited grooves could be provided with appropriate feathering notches, etc., depending upon the needs of the particular system.

It is believed that various other alterations and modifications of the present invention will occur to those skilled in the art upon a reading and understanding of the present specification. It is intended that all such alterations and modifications are included in the invention, insofar as they come within the scope of the appended claims.

What is claimed is:

1. A system of the type for controlling the flow of fluid from a source of pressurized fluid to a priority load circuit and to an auxiliary load circuit, the priority load circuit including valve means defining a main, variable flow control orifice and means providing a load pressure signal means representative of the demand for fluid flow by the priority load circuit, a priority flow control valve means including an inlet port in fluid communication with said source of fluid, a priority outlet port in fluid communication with the priority load circuit, an excess flow outlet port in fluid communication with the auxiliary load circuit, a priority valve member movable between one position permitting substantially unrestricted fluid communication from said inlet port to said priority outlet port, and another position permitting substantially unrestricted fluid communication from said inlet port to said excess flow outlet port, means biasing said priority valve member toward said one position, and said priority valve member being biased toward said another position by said load pressure signal means communicated from said priority load circuit, characterized by:

(a) bypass valve means disposed in series flow relationship between said excess flow outlet port and the auxiliary load circuit;

(b) said bypass valve means including a bypass valve member and means biasing said bypass valve member toward a first position in which said bypass valve member is operable to communicate the auxiliary load circuit to a region of relatively low pressure fluid;

(c) said bypass valve member defining flow orifice means disposed such that substantially all flow to the auxiliary load circuit flows through said flow orifice means, the flow through said flow orifice means resulting in a pressure differential across said flow orifice means, said pressure differential biasing said bypass valve member, in opposition to said biasing means, toward a second position in which said bypass valve member substantially prevents fluid communication from the auxiliary load circuit to said region of relatively low pressure fluid;

(d) whereby, below a predetermined flow from said excess flow outlet port, said bypass valve member is biased toward said first position and attempted actuation of the auxiliary load circuit is ineffective to increase the load on the system.

2. A system as claimed in claim 1 characterized by the priority load circuit comprising a steering circuit including a steering cylinder and a steering control unit of the type including said valve means and a fluid-actuated means for imparting follow-up movement to said valve means in response to the flow of fluid to said steering cylinder.

3. A system as claimed in claim 2 characterized by said means providing said load pressure signal means comprises a load signal passage communicating with said priority load circuit downstream of said main flow control orifice and a pilot passage communicating with said priority load circuit upstream of said main flow control orifice.

4. A system as claimed in claim 3 characterized by the fluid pressure in said load signal passage biasing said priority valve member toward said one position and the fluid pressure in said pilot passage biasing said priority valve member toward said another position.

5. A system as claimed in claim 1 characterized by said bypass valve means including a valve housing defining a valve bore and said bypass valve member comprises a valve spool slidably disposed in said valve bore and movable between said first and second positions, said flow orifice means comprising a fixed flow orifice defined by said valve spool.

6. A system as claimed in claim 5 characterized by said flow orifice means including said valve housing and said valve spool defining a secondary, variable flow orifice, in parallel with said fixed flow orifice and, having a minimum flow area when said valve spool is in said first position and a maximum flow area when said valve spool is in said second position.

7. A system as claimed in claim 6 characterized by said minimum flow area of said secondary variable flow orifice substantially preventing flow therethrough when said valve spool is in said first position and said variable flow orifice beginning to permit substantial flow therethrough as said valve spool approaches said second position, and begins to substantially prevent fluid communication from the auxiliary load circuit to said region of relatively low pressure fluid.

8. A system as claimed in claim 7 characterized by said secondary variable flow orifice being selected such that the pressure differential across said bypass valve means remains approximately constant as said valve spool moves from said first position to said second position, and said secondary variable flow orifice increases from said minimum flow area to said maximum flow area.

* * * * *